(12) United States Patent  (10) Patent No.: US 6,170,606 B1
Merz  (45) Date of Patent: *Jan. 9, 2001

(54) ANALOG CONTROL

(75) Inventor: Ernest J. Merz, Waynesboro, PA (US)

(73) Assignee: Safety Dynamicon, Inc., Waynesboro, PA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/672,427

(22) Filed: Jun. 28, 1996

(51) Int. Cl.$^7$ .................................................. E04G 3/00
(52) U.S. Cl. ........................ 182/2.1; 182/2.11; 182/148
(58) Field of Search ........................... 182/2.1, 2.2, 2.3, 182/2.7, 2.8, 2.9, 2.11, 148; 341/20

(56) References Cited

U.S. PATENT DOCUMENTS

| | | | |
|---|---|---|---|
| 3,498,411 | * 3/1970 | Worden | 182/2.9 X |
| 3,534,832 | * 10/1970 | Rediske | 182/2.9 X |
| 3,584,705 | 6/1971 | Ruegg | 182/13 |
| 3,590,948 | 7/1971 | Milner, Jr. | 182/2 |
| 3,648,538 | 3/1972 | Sammarco et al. | 74/491 |
| 3,710,644 | 1/1973 | Downing et al. | 74/526 |
| 3,809,182 | * 5/1974 | Wilson | 182/2.9 X |
| 3,835,957 | 9/1974 | Richards | 182/19 |
| 3,924,766 | 12/1975 | Canning | 214/764 |
| 4,044,856 | 8/1977 | Stevenson | 182/2 |
| 4,049,081 | 9/1977 | McDonald et al. | 182/148 |
| 4,081,055 | 3/1978 | Johnson | 182/2 |
| 4,084,619 | 4/1978 | Johnson | 137/636.2 |
| 4,089,388 | 5/1978 | Johnson | 182/2 |
| 4,113,054 | 9/1978 | Myers | 182/2 |
| 4,116,304 | 9/1978 | Durnell | 182/2 |
| 4,121,687 | 10/1978 | Ulrich, II et al. | 182/2 |
| 4,137,994 | 2/1979 | Wood | 182/2 |
| 4,146,998 | 4/1979 | Johnson | 52/115 |
| 4,160,492 | 7/1979 | Johnston | 182/2 |
| 4,331,215 | 5/1982 | Grove et al. | 182/2 |
| 4,359,137 | 11/1982 | Merz et al. | 182/2 |
| 4,418,791 | 12/1983 | Frey-Wigger | 182/2 |
| 4,427,121 | 1/1984 | Clements | 212/231 |
| 4,429,763 | 2/1984 | Houck | 182/2 |
| 4,437,543 | 3/1984 | Fortin et al. | 182/2 |
| 4,456,093 | 6/1984 | Finley et al. | 182/2 |
| 4,512,436 | 4/1985 | Freudenthal et al. | 182/2 |
| 4,520,894 | 6/1985 | Hensler | 182/2 |
| 4,656,461 | * 4/1987 | Morsch et al. | 341/20 |
| 4,660,730 | 4/1987 | Holmes | 212/163 |
| 4,679,653 | 7/1987 | Pasquarette, Jr. et al. | 182/2 |
| 4,713,981 | 12/1987 | Zahn | 74/479 |
| 4,716,399 | * 12/1987 | Nordlund | 341/20 X |
| 4,724,924 | 2/1988 | Breyer et al. | 182/2 |
| 4,754,840 | 7/1988 | MacDonald et al. | 182/2 |
| 4,757,875 | 7/1988 | Hade, Jr. et al. | 182/2 |
| 4,762,199 | * 8/1988 | Holmes | 182/148 X |

(List continued on next page.)

FOREIGN PATENT DOCUMENTS 0 126 223 A2  11/1984  (EP) .
WO 85/00547  2/1985  (WO) .

*Primary Examiner*—Daniel P. Stodola
*Assistant Examiner*—Richard M. Smith
(74) *Attorney, Agent, or Firm*—Woodcock Washburn Kurtz Mackiewz & Norris

(57) ABSTRACT

A mobile machine which carries the operator of the machine is equipped with a control which has a shape, geometry and motion analogous to that of the machine and which causes machine motion analogous to the motion imparted to the control by the operator. The analog control may be applied on mobile equipment including aerial work platforms, forklifts, front end loaders, backhoes, earth movers, bulldozers, diggers, trenchers, agricultural equipment, mining machinery, and other operator controlled vehicular equipment by tailoring the shape, geometry and motions of the control to be analogous to those of the machine being controlled.

22 Claims, 4 Drawing Sheets

U.S. PATENT DOCUMENTS

| | | | |
|---|---|---|---|
| 4,784,278 | * | 11/1988 | Luscombe .................... 182/2.11 X |
| 4,793,437 | | 12/1988 | Hanthorn ........................ 182/102 |
| 4,799,573 | | 1/1989 | Simnovec et al. ................... 182/2 |
| 4,855,704 | * | 8/1989 | Betz ............................ 341/20 X |
| 4,883,145 | | 11/1989 | Deltattto ............................ 182/2 |
| 4,890,692 | | 1/1990 | Oakman ........................ 182/141 |
| 4,926,172 | * | 5/1990 | Gorsek ............................. 341/20 |
| 4,945,357 | * | 7/1990 | Tal ................................. 341/20 |
| 4,953,666 | | 9/1990 | Ridings ........................... 187/9 R |
| 5,021,917 | | 6/1991 | Pike et al. ...................... 361/195 |
| 5,082,085 | | 1/1992 | Ream et al. ........................ 182/2 |
| 5,088,020 | * | 2/1992 | Nishida et al. ................. 364/160 |
| 5,099,950 | | 3/1992 | Kishi ............................... 182/18 |
| 5,109,952 | | 5/1992 | Starks et al. ...................... 182/63 |
| 5,129,480 | | 7/1992 | Garrett et al. .................... 182/63 |
| 5,182,557 | * | 1/1993 | Lang ................................ 341/20 |
| 5,196,998 | | 3/1993 | Fulton ....................... 364/167.01 |
| 5,224,589 | * | 7/1993 | Karakama et al. ............ 341/20 X |
| 5,225,831 | * | 7/1993 | Osborn ............................. 341/20 |
| 5,228,356 | * | 7/1993 | Chuang ........................ 341/20 X |
| 5,269,393 | * | 12/1993 | Luscombe ....................... 182/2.2 |
| 5,390,104 | | 2/1995 | Ffulton ...................... 364/167.01 |
| 5,398,028 | * | 3/1995 | Foon ................................ 341/20 |
| 5,431,247 | | 7/1995 | Kishi ............................... 182/63 |

\* cited by examiner

ANALOG CONTROL

BACKGROUND OF THE INVENTION

Aerial work platforms have been developed and in use for more than twenty five years. Their primary purpose is to raise workers quickly and safely to positions to do necessary work. They replace earlier means of access such as ladders and scaffolds. Some models can also reach below a surface or a long horizontal distance from the surface on which they are located, and some types of lifts can place workers as high as 150 to 250 feet above the ground.

The first three of the following make up the major population of such machines:

1. Vehicle-Mounted Elevating and Rotating Aerial Devices as covered by ANSI/SIA A92.2-1990. These machines are typically mounted on a commercial truck chassis but may be mounted on a trailer chassis and are used in erection and maintenance of utility lines. They include models where the work platform is supported by an articulating or a telescoping boom which is mounted on a turntable that can rotate about a vertical axis.

2. Boom-Supported Elevating Work Platforms as defined in ANSI/SIA A92.5-1992. These machines are self-propelled, typically have a telescoping and/or articulating boom and are used in construction and maintenance tasks.

3. Self-Propelled Elevating Work Platforms as defined in ANSI/SIA A92.6-1990. These machines (typically scissor-lifts) elevate the work platform vertically but do not position the platform horizontally completely outside the base on which it is supported. They are also used in general construction and maintenance tasks.

4. Manually Propelled Elevating Work Platforms as defined in ANSI/SIA A92.3-1990. These machines are manually propelled and have platforms that cannot be positioned completely outside the base.

5. Airline Ground Support Vehicle-Mounted Vertical Lift Devices as defined in ANSI/SIA A92.7-1990. These are machines designed specifically for aircraft servicing and maintenance.

6. Vehicle-Mounted Bridge Inspection and Maintenance Devices as defined in ANSI/SIA A92.8-1993. These machines are designed to reach out, down and under a bridge for inspection and maintenance.

7. Mast-Climbing Work Platforms as defined in ANSI/SIA A92.9. These machines are designed to place several workers on a platform along a wall or similar vertical surface to do extensive operations.

Controls for operating most of the types of aerial platforms mentioned above are comprised of electrical switches or other devices mounted at an operator's station on the platform. These electrical devices control valves or other means on the chassis which in turn activate hydraulic or electrically powered devices such as cylinders or motors. Mechanical controls are difficult or impossible to use for controls on the platform because of the distance from the platform to the chassis and the mechanical positioning of the platform relative to the chassis in order to reach the desired work location. Likewise, it is difficult and inefficient, except in the simplest machines, to route multiple hydraulic lines with hoses at mechanical joints up to the platform where hydraulic valves could be used to control machine motions. Therefore, the industry practice has evolved to the use of electrical switches and controllers on the platform which actuate hydraulic or electrical means on the chassis to cause the desired motion. Two general types of electrical devices are (1) the simple on/off switch that may be actuated in two directions, e.g., up or down, and usually is spring loaded to return to neutral, and (2) the controller type of switch that usually provides an electrical output signal proportional to the displacement of the handle of the controller. The proportional controller is important to the operator and is used to make smooth starts and stops and to move at a reduced rate of speed as existing conditions may make desirable. Proportional controllers are used on most sophisticated aerial work platforms and on those providing greater platform height. The two types are used interchangeably in this document and it will be understood that the word "switch" is to be interpreted broadly and includes a controller, and vice versa.

Switches were typically located on the operator's control panel in patterns which may have been influenced by aesthetics, space considerations and fabrication economy. Beginning in 1980, the applicable consensus standard for boom-supported elevating platforms (ANSI A92.5-1980) specified that "all directional controls shall move in the direction of the function which they control when possible, and shall be of the type which return to the 'off' or the neutral position when released. Such controls shall be protected against inadvertent operation." Directional controls are defined in the ANSI A92.5-1980 Standard as "all controls necessary to raise, lower, rotate, telescope, drive or otherwise initiate the powered functions of the work platform." A similar requirement had first appeared in the ANSI A92.6-1979 Standard on Self-propelled Elevating Work Platforms, albeit without the definition of "directional controls."

One design with clear advantages with respect to earlier control arrangements is disclosed and described in U.S. Pat. No. 4,331,215—Grove et al. This patent discloses controls that are individual electric devices mounted on a surface slightly inclined to the vertical or on a second surface slightly inclined to the horizontal. This arrangement permits all of the controls to operate in substantially the same direction in which the platform moves as a result of the control activation. This design meets the requirement of the applicable consensus standard (ANSI A92.5-1980) and provides an approach that minimizes operator error, a major cause of accidents on aerial work platforms.

As noted in the Grove et al. patent workers such as electricians, painters, sandblasting operators, bricklayers and carpenters using these machines are skilled primarily in the area of their work specialty and the aerial platform they are using serves solely as a positioning means, hence, many operators do not become proficient as do the trained operators of cranes or earth-moving machinery who do nothing but operate such machines full time. Moreover, operators of aerial platforms may use one machine for a few days and may then be assigned a different make and model that has a different control arrangement, or may even rent different machines for use on an "as needed" basis. Although operators of aerial platforms are required to be trained, such training may be limited and often does not include specific training on the control variations used on different makes and models. Therefore, the opportunity for inadvertent errors is increased by the requirement for the operator to first select the proper control, second, to check to be certain of which way to operate the control handle, and third, to then implement the control operation.

Other machines utilize controls which differ from the typical steering wheel, accelerator, brake, and gear shift with which most people are familiar. Various construction vehicles such as skid-steer loaders, bulldozers, and front end loaders are provided with control levers usually based on the mechanical devices which effect the motion but do not necessarily move in a direction of the motion caused nor do they provide a simulated model of the machine for quick operator recognition and orientation. Certain models of power lawn mowers currently available also utilize levers to effect driving and steering but lack the analogous motion and the simulated model of the machine for quick operator recognition and orientation. Another control layout which was developed on early aircraft and is still used on certain light aircraft and military fighters is the pilot's cockpit control stick. When the control stick is pushed to the left, the aircraft rolls to the left in response; when the stick is pushed forward, the aircraft rotates nose downward in response. However, the control stick does not provide the third axis control for the rudder, and, most importantly, does not provide the simulated model which ensures the quick recognition and orientation needed for aerial platform operators. Pilots are required to be trained and licensed, even for light civilian aircraft, while military aircraft can only be flown by pilots who have hundreds of hours of training and flight experience. On the other hand, training of aerial platform operators is often minimal; indeed, a worker at a large construction site will often come upon an aerial platform not in use, will start it if possible, and will proceed to use it without permission or any training.

Further requirements for the operator's controls are specified in the ANSI/SIA A92.6-1990 Standard for Self-Propelled Elevating Work Platforms that require that the upper controls (on the platform) shall "include a control which shall be continuously activated in order for upper directional controls to be operational and which automatically returns to the off position when released." A similar requirement is specified in the ANSI/SIA A92.5-1992 Standard for Boom-Supported Elevating Work Platforms by specifying that the upper controls provided at the platform shall "include a separate safety control which shall be continuously activated for upper directional controls to be operational, and which renders upper directional controls inoperative when released." These requirements have typically been met by having a separate foot pedal or an equivalent switch that must be operated by the operator in order for the directional controls to be used. A foot pedal can be actuated by the operator while using one hand to operate the directional control. However, in addition to the cost and installation expense, the foot pedal requires an electrical cord connection which must be durable, and together with the pedal is subject to rough service, deterioration due to weather conditions and damage from falling objects. A separate hand switch may be utilized but the operator may then be required to use both hands. A safety control may be integrated into each directional control but this would require three or more duplicate safety switches, with the controls of each capable of being released by the operator if he or his hand is trapped such that he cannot return the directional control to neutral. The safety control, in order to be most effective and provide maximum safety enhancement, must meet at least the following requirements:

1. It must prevent inadvertent operation of a directional control in case the directional control is struck by the operator, by other personnel or by a falling object or tool being used in performance of the work task;

2. When released it would preferably provide a signal to stop all powered functions if a malfunction occurs in the directional control or any other component of the control system;

3. When released it would preferably provide a signal to stop all powered functions if a malfunction occurs in any component of the power supply system; and 4. It would preferably provide a signal to stop or prevent unsafe powered motion that may be caused by a single point failure mode.

Thus, despite the advances made in the art, the control systems and arrangements discussed above are deficient in not providing a total human factors solution and in not utilizing a control configuration and mechanism that can provide rapid and certain recognition and orientation to both trained and untrained operators, resulting in increased safety and operator efficiency.

SUMMARY OF THE INVENTION

The present invention provides an analog control comprising a mechanism that operates with motions similar to those of the aerial platform and causes an equivalent motion of the aerial platform when operated. The shape of the overall control is similar, i.e., analogous to that of the aerial platform so that recognition and comprehension by the untrained operator is expedited and assured. A typical aerial platform comprises a platform and an elevating means preferably supported on a self-propelled chassis or on a commercial truck chassis. The rotating models utilize a turntable or turret which supports the elevating mechanism and may be rotated up to 360 degrees on a vertical axis. For such a machine having a telescoping boom, the analog control of the present invention incorporates several motion controls. First, swinging or rotating the turntable left or right about the vertical axis is controlled. Second, the raising or lowering the boom as supported on the turntable is controlled. Next, the extension or retraction of the telescoping boom is controlled.

In addition, by the use of an enable button-type switch (or other type switch) on the handgrip, additional functions may be controlled by the analog control of the present invention. For example, such a switch preferably controls driving forward and backward by pushing or pulling as in telescoping; steering left or right as in swing; raising or lowering jib boom or other boom apparatus; rotating the platform on a vertical axis at a point of attachment to the end of the boom; and tilting or leveling the platform on a horizontal axis to correct or adjust for minor deviations in the leveling system.

In preferred embodiments, the analog control of the present invention comprises a generally circular fixed structure attached to a control console or other structure convenient to the operator's station in a platform and a rotating mechanism supported by and attached to a fixed structure. The fixed structure assembly also provides actuating means for the switch which is mounted on the rotatable structure and causes rotation of the turntable of the aerial platform. The fixed structure includes a lockplate into which a pin is inserted to prevent motion of the control in swing (rotate) or lift (raise or lower the boom) directions. The structure of the rotating mechanism is preferably circular, rectangular or some combination thereof in the plan view and supports the lockplate matching that on the fixed structure. The switch or controller that causes motion of the boom in the lift or lower direction is attached to the inside of the rotating structural element and is actuated by raising or lowering the simulated boom which is attached on top of the rotatable structure by a bracket at one edge. The outer section of the simulated boom is attached by a pin or bolt to the bracket. The simulated boom also preferably includes an inner boom section which telescopes within the outer section. In certain embodiments a switch is mounted on the outer boom near the hinged end and is operated by telescoping motion of the inner boom to provide the equivalent motion by the telescoping boom of the aerial platform. In these embodiments a bracket is attached to the outer boom that, through a connecting link, controls the lift switch supported on the rotating structure, and thereby causes lifting or lowering of the boom of the aerial platform.

The inner tube of the simulated boom is attached to a handgrip at the outer end with a safety lever located so that it is convenient for the operator to squeeze the handgrip and safety lever with one hand. Also a part of the outer boom tube are brackets which support a pivot for the lock lever that acts as the detent or lock for swing and lift motions of the simulated boom control. The lock lever, in turn, is operated by the lock link when the operator pulls the safety lever toward the handgrip. Also mounted within the handgrip is an on/off safety switch that is activated by the final motion of the safety lever when squeezed. The safety switch, as specified in the consensus standards, must be actuated, i.e., in the "on" position, for the upper directional controls to be operational. Such a system renders the upper directional controls inoperative when released. The safety lever also supports and operates a detent thereby locking the inner tube of the simulated boom to the outer tube, and preventing telescoping motion unless the safety lever is operated.

Accordingly, it is an overall object of the present invention to provide an integrated and human-engineered directional control for use by the operator of an aerial platform. It is another object of the present invention to provide a control having a shape substantially analogous to the shape of the aerial platform it controls. It is a further object of this invention to provide a control having allowable motions substantially analogous to the motions of the aerial platform it controls.

It is yet another objective of the present invention to provide a control for aerial platforms that combines three or more directional controls into a single control assembly. It is another object of this invention to provide a control for aerial platforms which enhances safety by reducing the probability of the operator selecting the wrong control. It is a further object of the present invention to provide a control for aerial platforms which increases the work efficiency of the operator and of the aerial platform by reducing the time spent in selecting and operating separate controls for each motion desired. It is a still further object of this invention to expedite operator recognition and orientation of the control and its functions. Another object of this invention is to facilitate operator training by providing a control having a shape and motions substantially analogous to the aerial platform being controlled. It is another object of this invention to provide a control having mechanical detents or locks to prevent motion of the control unless the safety lever is operated. It is another object of this invention to prevent inadvertent operation of the control unless a safety lever is operated. Another object of this invention is to prevent accidental operation of the control by a falling tool or piece of material or by inadvertent contact by personnel. It is yet another object of this invention to incorporate a safety switch into the control which must be continuously actuated by the operator in order for the directional controls to be operational and which stops all powered functions when released.

It is an object of this invention to provide a control for aerial platforms with a safety switch which stops all powered motion of the aerial platform when the control is released by the operator in case of a malfunction of any component of the control system or the power supply system. It is another object of this invention to provide a control which can be operated by using one hand only. It is another object of this invention to avoid the need for a separate foot-operated or hand-operated safety switch. It is a still further object of this invention to provide a safety control which avoids the fabrication, assembly, installation and maintenance costs of a separate foot-operated or hand-operated safety switch.

DESCRIPTION OF THE PREFERRED EMBODIMENTS

The preferred embodiments shown in the figures are explained with their advantages and applications. Those of skill in the art will understand that modifications and variations too numerous to present may be realized based upon the features and principles discussed herein, even though such modifications and variations will perform the same functions. It will therefore be understood that different mechanical components and geometry, as well as other electrical components, can be utilized on certain specific models of aerial platforms yet still use the present invention.

Figure 1:
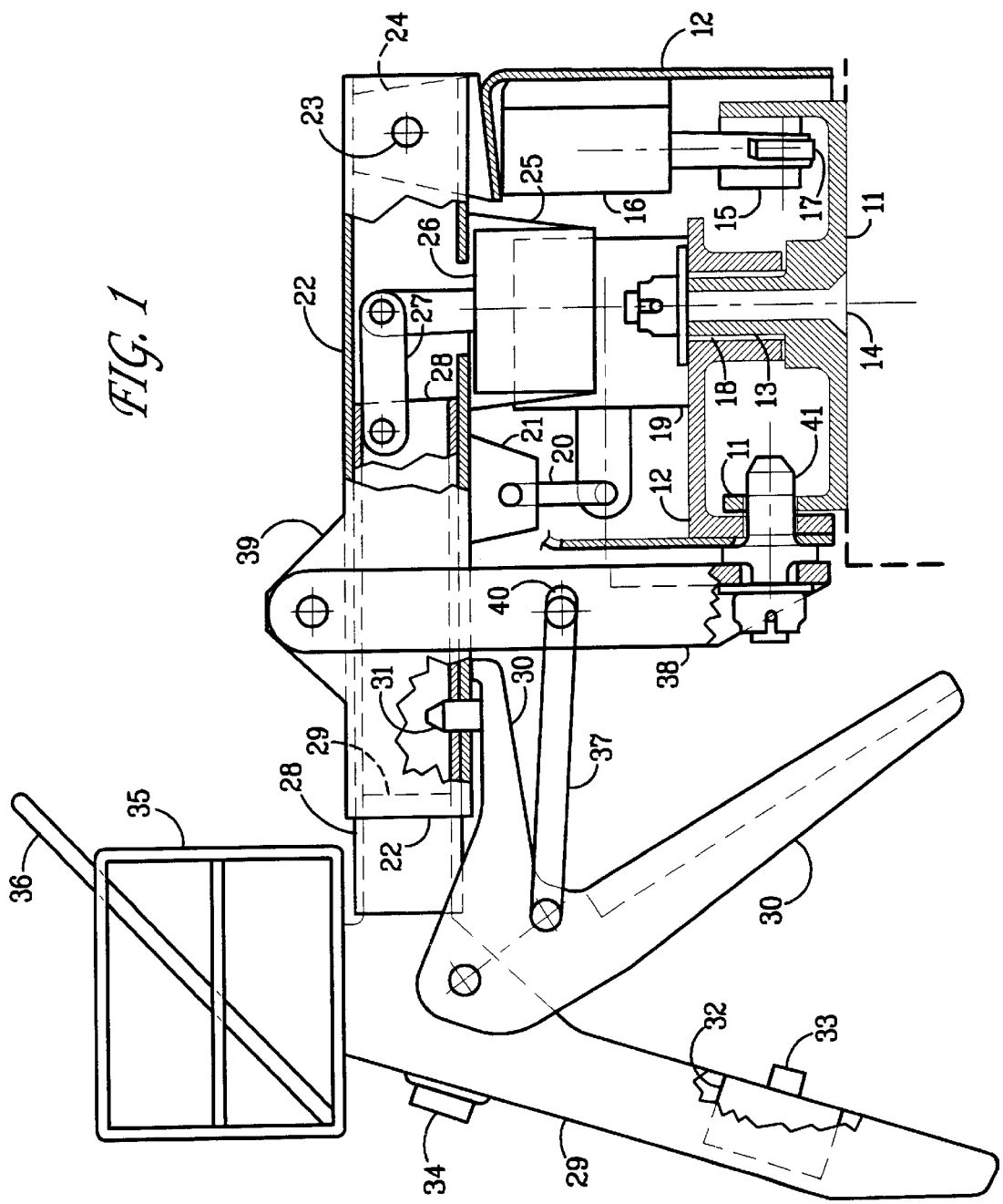
FIG. 1 is a side elevation view, partially broken away, illustrating the analog control of the present invention.

Referring now to FIG. 1, there is shown a control system for an aerial platform having a rotating turntable or turret on which a telescoping boom is supported. The turntable may be mounted on a self-propelled chassis (ANSI Type 2) or on a commercial truck chassis (ANSI Type 1). The boom may have two, three or more telescoping sections which fit within each other and are typically operated hydraulically for extension and retraction. The control simulates the upper works of the aerial platform, i.e., everything above the chassis of the supporting vehicle. In FIG. 1 the fixed structure 11 is attached by suitable bolts or other means to the structure of the work platform at the operator's station in the platform. The rotating structure 12 is supported and attached by spindle 13 and by bolt 14 such that it can rotate left or right from the neutral position. That rotation will cause the bracket 15 to operate switch 16 mounted on rotating structure 12 by contact with roller 17 on the actuating lever of the switch, or conversely, if the rotating structure is rotated the opposite direction, the switch 16 will be operated in the other direction by a bracket equivalent to bracket 15 but on the near side of roller 17. Switch 16 causes the turntable of the aerial platform to rotate in response to and in the same direction as the operator's control input. The rotation of the rotating structure 12 on the spindle 13 is facilitated by bearing 18 between the two parts. Also mounted on the rotating structure 12 is lift switch 19 which causes the boom of the aerial platform to be lifted or lowered with respect to the turntable. It can be noted that lift switch 19, operated by link 20 which in turn is operated by bracket 21 and outer boom tube 22 to which bracket 21 is attached, will be operated in one direction if the outer boom tube 22 is raised and in the opposite direction if outer boom tube 22 is lowered. By appropriate circuitry the boom of the aerial platform will be caused to be raised or lowered analogous to the motion of the operator's input motion with the simulated boom of the control. The outer boom tube 22 is attached to the rotating structure 12 by a pin 23 through bracket 24 which is attached to rotating structure 12. Also attached to outer boom tube 22 is bracket 25 on which telescope switch 26 is mounted. Switch 26 is operated by link 27 which is attached to and operated by the inside end of inner tube 28. By sliding inner tube 28 in or out it can be seen that opposite motions will be imparted to telescope switch 26 which operate the telescope system of the aerial platform in an analogous motion. Inner tube 28 is attached to and moved by handgrip 29 which is to be operated by the operator.

The safety lever 30 is attached to and operated in conjunction with handgrip 29. Incorporated in one leg of safety lever 30 is lock pin 31 which is engaged in matching holes in outer boom tube 22 and in inner boom tube 28 thereby locking the tubes together to prevent sliding of inner boom tube 28 within outer boom tube 22 unless lock pin 31 is withdrawn by operating safety lever 30. Enclosed within a portion of handgrip 29 is safety switch 32 which is actuated by contact of safety lever 30 with the operating plunger of safety switch 32. Safety switch 32 is typically a normally open switch which, when closed by operating lever 30, causes the appropriate electrical circuitry to provide electrical power to the directional controls, in this embodiment the lift, telescope and swing switches mounted in the analog control. A thumb-actuated enable switch 34 may also be provided on the upper part of the handgrip 29 on the side opposite the connection to inner tube 28. If appropriate for the specific model aerial platform, two or more of the enable switches may be provided to permit control of auxiliary functions.

If the control in FIG. 1 is to be used on an aerial platform mounted on a self-propelled chassis (Type 2) driving and steering functions may also be accomplished using the analog control. In that embodiment enable switch 34 may be a push button type switch which is "on" only as long as it is depressed, or it may be a two-position toggle switch or a rocker switch with on/off positions to enable or disconnect the driving mode. When switch 34 is "on" it provides means such as relays and other circuitry to disconnect the telescope function from switch 26 and substitute the drive function. Likewise, operating switch 34 will cause the steering function to replace the swing function operating through switch 16. Thus, in the driving mode, the operator will push the handgrip 29 forward operating switch 26 to drive forward and pull handgrip 29 rearward for reverse travel. Steering is accomplished by pointing the hinged end of the simulated boom in the desired direction, e.g., pointing to the left causes the aerial platform to steer left when driving forward. These motions of the aerial platform are also analogous to those of the analog control which caused the motions.

Safety lever 30 also provides a third function in addition to unlocking the telescope mechanism and operating the safety switch. When safety lever 30 is pulled by the operator it operates detent lever 38 through link 37 which is connected by a slot 40 in detent lever 38. It can be seen in FIG. 1 that operating safety lever 30 will cause detent lever 38 to withdraw lockpin 41 from fixed structure 11 and rotating structure 12, thereby permitting up and down motion of the handgrip 29 and the simulated boom, and rotational motion of the handgrip 29 and rotating structure 12. Thus, operating the safety lever 30 releases the handgrip 29 and the simulated boom to move in all three planes, 1) up and down to cause lifting and lowering of the aerial platform's boom, 2) telescoping in and out to cause retraction and extension of the aerial platform's telescoping boom, and 3) rotating left and right to cause swing left and right of the aerial platform's turntable.

Detent lever 38 is pivotally supported on a pin through bracket 39 which is attached to the outer tube 22 of the simulated boom. Hence, the detent lever must be provided with extra travel to have sufficient clearance from rotating structure 12 considering the telescoping of the simulated boom and the lowering of the simulated boom. Lockpin 41 is installed in a vertical slot in detent lever 38 so that it may be adjusted to accommodate production tolerances and the neutral position of switch 19. A slot 40 is also located at the attachment of link 37 to detent lever 38 in order to permit the safety lever 30 to move sufficiently to release plunger 33 of safety switch 32, thereby stopping all powered functions without moving detent lever 38 to its fully locked position, in case detent lever 32 is prevented from moving to its locked position due to displacement of one of the three motions away from neutral.

A small scale platform 35 is shown attached to the top of handgrip 29. Different shapes and sizes of this platform may be used to provide a close simulation for a specific model aerial platform and to complete the shape of the analog control in its function in recognition by the operator and orientation of the operator. The platform 35 also supports instruction plate 36 which is located at that position to provide specific instructions for use of the analog control. Platform 35 also provides a third function as a horizontal guard over the operator's hand as protection from falling objects which might injure his hand or jam the analog control. While such guards are not normally installed on current controls, the analog control disclosed will provide this extra safety feature in order to ensure that the operator can release the safety lever 30 from contact with safety switch 32.

It will be understood that springs are located such that the mechanism and switches for the directional controls will be returned to the neutral position shown in FIG. 1 although not shown for clarity. Detent lever 38 and safety lever 30 are also spring loaded to return to the position shown in FIG. 1 which locks the control against any motion regardless of the position when released by the operator. Likewise, the electrical connections and wiring to the switches are not depicted but may be routed within the simulated boom tubes and the rotating portion of the assembly culminating in a single bundle and connector which may pass through the fixed structure 11 or may interface with the wiring harness of the aerial platform at that approximate location.

Figure 2:
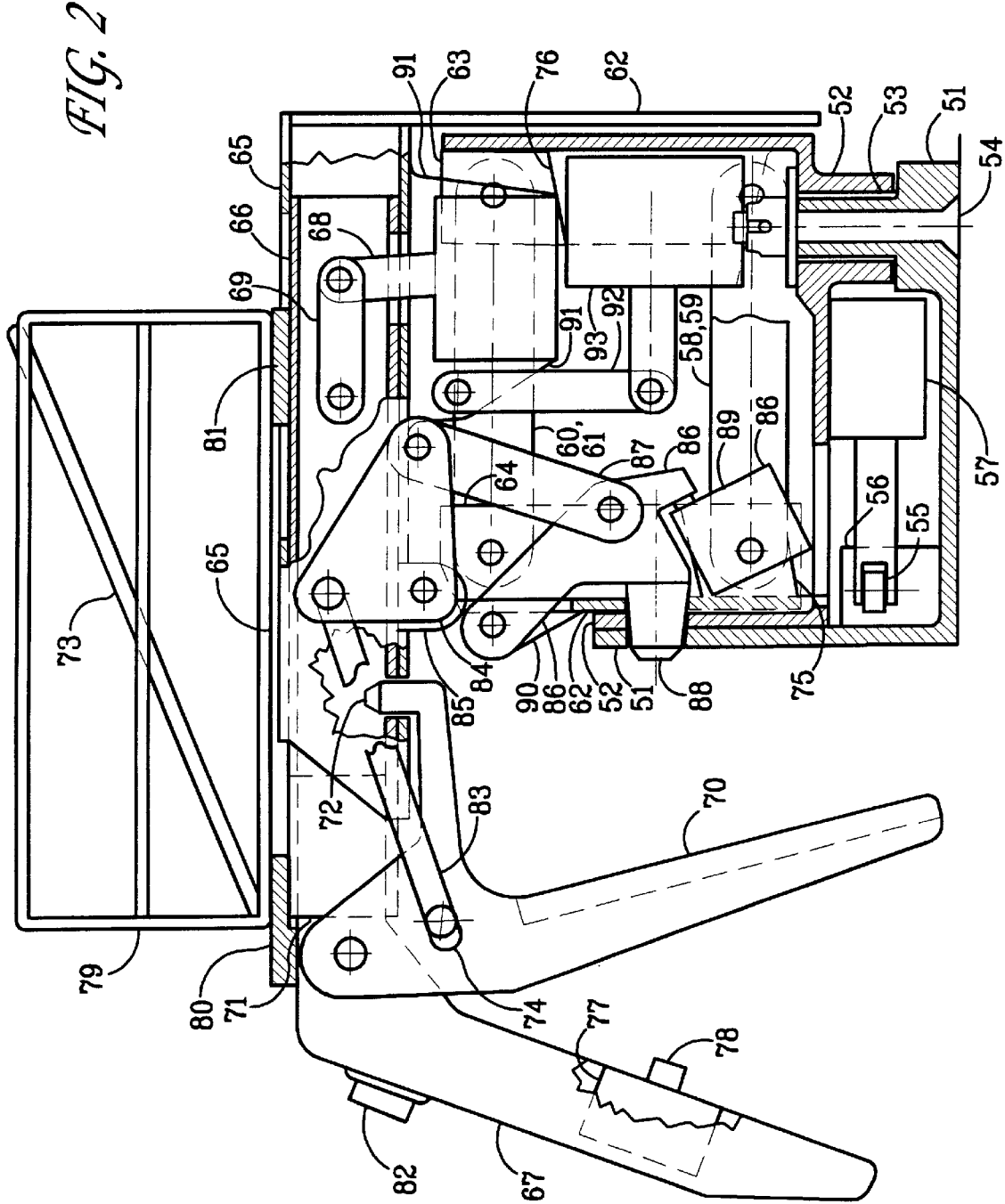
FIG. 2 is a side elevation view, partially broken away, illustrating an alternate embodiment of the analog control of the present invention.

The embodiment shown in FIG. 2 is an analog control system for an aerial platform which elevates the work platform vertically but does not position the platform completely outside the base on which it is supported (Type 3). These machines are typically self-propelled scissorlifts but may be mounted on a truck chassis. As such, the primary control function is to position the platform is to elevate or lower the platform. Hence, the embodiment in FIG. 2 includes means to control driving and steering the chassis of a self-propelled aerial platform. If the machine under consideration is mounted on a truck chassis (Type 1) the drive and steer functions can be eliminated and the control can be greatly simplified.

The analog control in FIG. 2 is supported on and attached to fixed support 51 which, in turn, is rigidly attached to support structure at the operator's station on the platform such that the right end of the control is toward the front of the aerial platform. The rotating assembly 52 is attached to fixed support 51 via bolt 54 and a suitable bearing 53. Attached to the lower side of rotating assembly 52 is control switch 57 which provides signals to the steering mechanism. As rotating assembly 52 is pivoted the control switch 57 will be operated by contact of roller 55 on the operating lever of the switch with bracket 56 on fixed support 51. If rotating assembly 52 is rotated the other direction roller 55 will contact an equivalent bracket thereby operating switch 57 in the opposite direction.

The elevating function is simulated in this embodiment by an elevating assembly 62 which is attached to rotating assembly 52 by two sets of parallel links designated 58, 59 and 60, 61. In FIG. 2 the right ends of these links are pivotally attached to two parallel vertical ribs 63 which are part of rotating structure 52. The left ends of parallel links 58, 59 and 60, 61 are attached to two similar ribs 64 which are part of elevating assembly 62. It can be seen that as elevating assembly 62 is raised, the parallel links will maintain the attitude of elevating assembly 62 with respect to fixed support 51.

Part of elevating assembly 62 is beam 65 which may be a tube or a hat section in cross section. Beam 65 is rigidly attached to and becomes a part of elevating assembly 62. Inner tube 66 is slidably engaged within beam 65 such that handle 67 can be used to slide tube 66 to the right or left as shown in FIG. 2. This sliding motion is used to actuate drive switch 68 via link 69 which is attached to tube 66 near its right end. Thus, pushing handle 67 to the right will cause drive switch 68 to impart a drive/forward signal to the drive system and pulling handle 67 to the left will cause drive switch 68 to impart a drive/reverse signal to the drive system of the aerial platform.

Handle 67 is inserted into and attached to the left end 71 of tube 66. Also attached to handle 67 is safety lever 70 which has a lock pin 72 that engages both tube 66 and beam 65 to cause locking of the drive motion. Safety switch 77 is mounted within handle 67 such that its operating plunger 78 will be actuated by safety lever 70 during its final motion as the operator squeezes safety lever 70 toward handle 67. This operation of safety switch 77 at the end of the stroke of safety lever 70 is important so that the operator can release safety lever 70 and it will immediately release safety switch 77 to stop all motion of the aerial platform.

Also supported on and attached to handle 67 is a simulated platform 79 which may be shaped to resemble the aerial platform on which the analog control is to be used. The simulated platform is attached to handle 67 through spacer 80 in order to provide clearance from beam 65. The right end of simulated platform 79 is attached to tube 66 via spacer 81. A thumb actuated enable switch 82 may be provided on handle 67 to control auxiliary functions such as extending a platform extension. Two or more enable switches may be provided as appropriate for a specific model aerial platform. Shown on simulated platform 79 is support 73 for an instruction plate that may be provided at that location to give specific instructions for operating the analog control.

When safety lever 70 is pulled by the operator of the aerial platform it also operates bellcrank 84 via link 83 which connects to the safety lever 70 at a slot 74. Slot 74 permits safety lever 70 to be released sufficiently to disengage safety switch 77 even though safety lever 70 cannot immediately return to the locked position shown in FIG. 2. Bellcrank 84 is rotated counterclockwise when it is operated by link 83 thereby causing link 87 to pull back lock lever 86 from the locked position shown in FIG. 2. In that position lock pin 88 of lock lever 86 extends through elevating assembly structure 62, through rotating assembly 52 and through fixed support 51 thereby locking the control against both elevating and rotating motions. It may be possible to eliminate the portion of rotating assembly 52 from the above locking means since locking elevating assembly 62 directly to fixed support 51 will lock out both elevating and rotating motions.

As a secondary safety backup power supply switch 89 is mounted on bracket 75 on rotating assembly 62 such that it is contacted and operated by lock lever 86 when in the locked position shown in FIG. 2. Switch 89 is a normally open switch and is closed by lock lever 86 as shown in FIG. 2.

The purpose of switch 89 is to prevent activation of the primary power supply at the beginning of use of the aerial platform unless the analog control is in the neutral and locked position shown in FIG. 2. Disabling initiation of the primary power supply may be accomplished, for instance, by disabling the starter circuit of an internal combustion engine, or by disabling the primary relay of an electrically powered aerial platform. When lock pin 88 is fully engaged as shown in FIG. 2 it provides visual confirmation that the analog control is locked in neutral. Lock lever 86 is pivotally mounted on bracket 90 which is a part of elevating assembly 62. This attachment may be divided, i.e., a two prong type to permit clearance from the portions of rotating assembly 52 and fixed support 51 when the elevating assembly 62 is lowered to cause lowering of the platform. Bellcrank 84 is pivoted on bracket 85 which is a part of tube 66 with slots in beam 65 for clearance and sliding of tube 66.

Drive switch 68 is mounted on bracket 91 which is attached to beam 65. Also attached to bracket 91 is link 92 which operates lift switch 93. Lift switch 93 is mounted on bracket 76 which is part of rotating assembly 52; thereby, lift switch 93 is not elevated when elevating assembly 62 is raised but is operated by link 92 attached to bracket 91 and beam 65.

It is to be understood that ramps or guides will be provided as necessary to ensure that lock pin 88 and lock pin 72 are guided smoothly into their respective locked positions when handle 67 is released at a position other than the neutral position shown in FIG. 2. Both safety lever 70 and lock lever 86 are spring loaded to return to the locked position. Likewise, although not shown for clarity, the mechanisms for the three primary controls are spring loaded to return to the neutral and locked position shown.

Elevating assembly 62 and its components are shaped to have a generally rectangular shape in the plan view so as to simulate a typical aerial platform with a vertically adjustable platform. This simulation may be enhanced by a decal or other means of embellishment on the sides of the elevating assembly 62 to more realistically resemble the aerial platform.

The embodiment shown in FIG. 2 provides motion of the aerial platform analogous to the motion the operator imparts to the analog control. When the operator raises the control handle the platform is raised; when the operator pushes the control handle forward the aerial platform is driven forward; when the operator points the control to the right the machine (if driving forward) is steered to the right.

Figure 3:
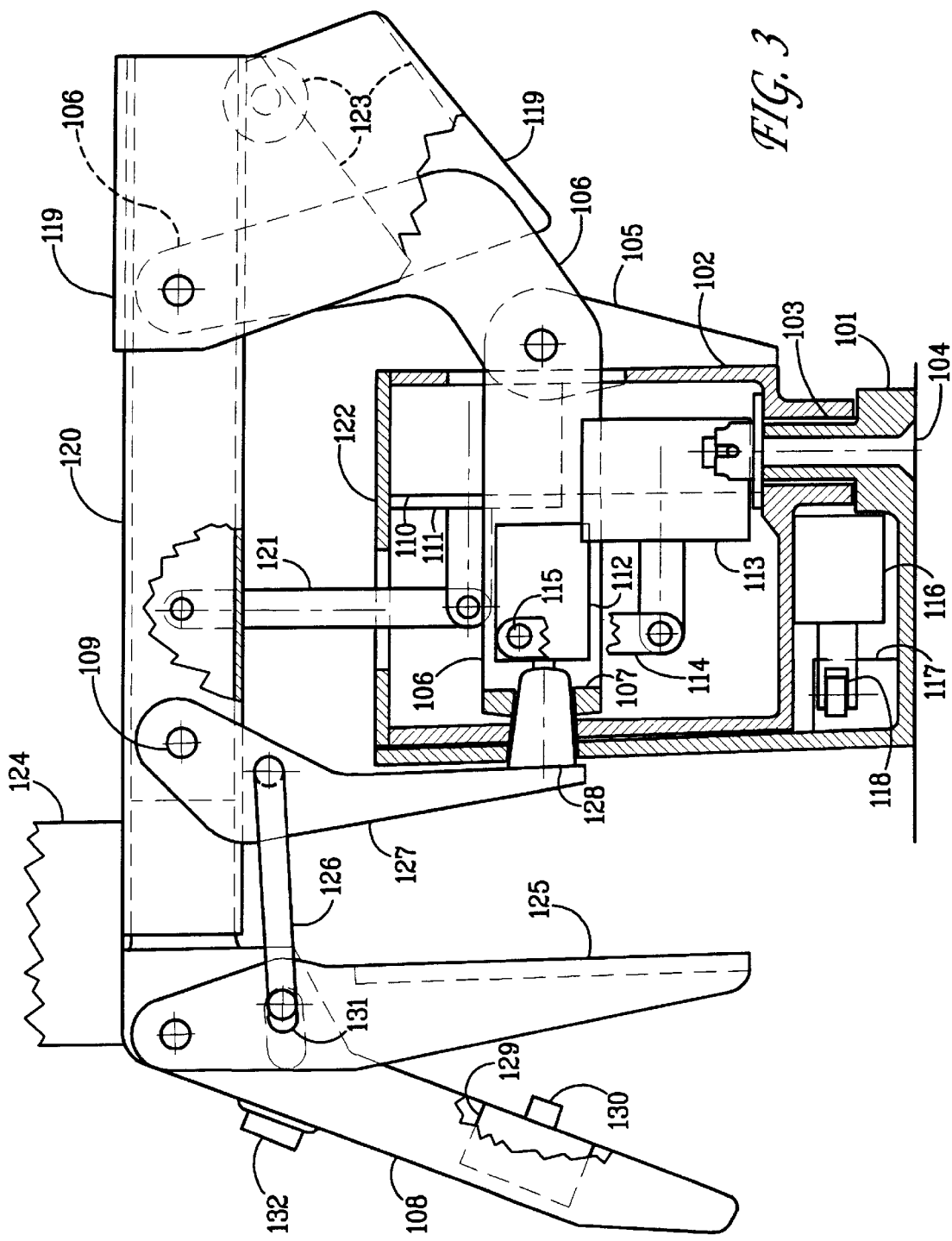
FIG. 3 is a side elevation view, partially broken away, showing another embodiment of the analog control of the present invention.

Another embodiment of the present invention is shown in FIG. 3. This embodiment is an analog control for an aerial platform having a rotating turntable or turret on which a two-piece articulating boom is supported with an operator's platform attached to the upper end of the upper boom. The turntable may be mounted on a commercial truck chassis (see Type 1) or on a self-propelled chassis (see Type 2). The embodiment shown in FIG. 3 is designed for a machine having two articulating booms but can be designed for an aerial platform having only one such boom, and, within limitations, for an aerial platform having more than two booms.

The analog control in FIG. 3 includes fixed support 101 which is rigidly attached to structure at the operator's station on the platform such that the right end of the control is toward the front end of the aerial platform. Rotating assembly 102 is attached to fixed support 101 via bolt 104 and a suitable bearing 103 to permit easy rotation. Lower boom 106 is attached to two flanges 105 which are a part of rotating assembly 102. Lower boom 106 is comprised of two plates that enter into the rotating assembly 102 and are jointed at the left end by lockplate 107. Outside the rotating assembly 102 lower boom 106 may be a closed box or other configuration to resist torque which may be caused by a side load on handle 108.

Located on the far side of lower boom 106 is rib 110 on which upper boom switch 111 is supported. In that location its operation will not interfere with power supply switch 112 which is located between the two plates comprising lower boom 106 and is attached to one of the plates. Likewise, lower boom switch 113 is supported on the rotating assembly 102 on the near side of the two lower boom plates and is operated by link 114 which is attached to lower boom 106 via pin 115.

Rotating control switch 116 is attached to the under side of rotating assembly 102 and is operated by contact of roller 118 with bracket 117 when assembly 102 is rotated. An equivalent bracket is located on the near side of roller 118 to operate switch 116 when assembly 102 is rotated in the other direction. Upper boom tube 120 which is pivoted on the upper end of lower boom 106 operates upper boom switch 111 through a hole in cover 122 which comprises the top surface of rotating assembly 102. It can be seen that when handle 108 is raised to elevate upper boom tube 120, link 121 will cause upper boom switch 111 to be operated sending the desired signal to the mechanism for elevating the upper boom of the aerial platform. When handle 108 is lowered, upper boom switch 111 will be operated in the opposite direction sending the signal to lower the upper boom. Likewise, pulling handle 108 to the left will cause lower boom 106 to rotate counterclockwise on its pivot on flanges 105 thereby causing link 114 to operate lower boom switch 113 sending the signal to the mechanism for raising the lower boom of the aerial platform. Pushing handle 108 to the right will cause lower boom switch 113 to be operated in the opposite direction thereby sending the signal to lower the lower boom of the aerial platform.

The primary purpose of channel 119 attached to the right end of upper boom tube 120 is to more completely simulate the appearance of a typical aerial platform having two articulating booms. Additional features 123 may be added to channel 119 by decals or by shaping to give the appearance of the particular model of serial platform on which the analog control is to be used. Similarly, simulated platform 124, mounted on handle 108 and boom tube 120, may be shaped to appear like a fiberglass bucket typically used on aerial platforms for utility line maintenance or it may be shaped to match the aerial platform on which the control is to be used.

Handle 108 is inserted into and attached to the left end of upper boom tube 120. Safety lever 125 is pivotally attached at its upper end to handle 108 and is operated by the operator when he grasps handle 108 to operate the control. As the safety lever 125 travels through its final motion it contacts operating pin 130 of safety switch 129 and causes the primary controls to be operational in compliance with the requirements of the industry standards. Hence, the first motion in releasing the safety lever 125 will cause the primary controls to be deactivated and all powered motion of the aerial platform to stop. To that end slot 131 is provided in safety lever 125 where link 126 is connected so that safety switch 129 will be released even if link 126 has not returned to the neutral and locked position shown in FIG. 3.

When safety lever 125 is pulled toward handle 108, link 126 operates lock lever 127 which rotates about its pivot 109 on upper boom tube 120. Thereby lock pin 128 is withdrawn from the locked position shown in FIG. 3 when safety lever 125 is operated, and the control is then free to operate in any and all of the three primary motions it controls. It will be noted that in the locked position, lock pin 128 prevents raising of the upper boom tube 120 via lock lever 127, prevents movement of lower boom 106 via lockplate 107 and prevents rotation by engaging rotating assembly 102. It is to be understood that upper boom tube 120, lower boom 106 and rotating assembly 102 are all spring loaded to the neutral position shown in FIG. 3. Likewise, safety lever 125 and lock lever 127 are spring loaded to return to the locked position shown.

The tip of lock pin 128 also contacts and operates power supply switch 112 which prevents activation of the primary power supply of the aerial platform unless the analog control is in neutral and locked as shown in FIG. 3. The tip of lock pin 128 has a smooth rounded surface to permit guiding it back into the holes without impediment. Also shown in FIG. 3 is enable switch 133, of which two or more may be provided for auxiliary functions as may be appropriate for a specific configuration aerial platform.

In summary of embodiment 3 shown in FIG. 3 it can be seen that 1) raising the handle causes analogous motion of the upper boom of the aerial platform, 2) pulling on handle 108 causes lower boom 106 and the lower boom of the aerial platform to be raised, and 3) rotating the analog control via handle 108 causes analogous rotation of the turntable of the aerial platform.

FIGS. 1–3 depict analog controls suitable for three of the most numerous configurations of aerial platforms; however, an analog control can be tailored for most configurations. For instance, an aerial platform having two articulating booms of which the upper boom also can telescope may be equipped with an analog control having some of the elements of the embodiment illustrated in FIG. 3 and some of the embodiment illustrated in FIG. 1. One approach immediately evident is to use the embodiment illustrated in FIG. 3 with one enable switch 133 to substitute upper boom telescope for the lower boom lift function. Then, by pulling on handle 108 the operator would cause the boom to extend out and by pushing on handle 108 he would cause the boom to retract; both motions of the control are analogous to the boom motions which result.

With respect to selection of specific mechanisms to simulate motions that are analogous to those of an aerial platform, many variations are possible. One preferred embodiment of the apparatus illustrated in FIG. 2 is to simulate driving by placing the control including the fixed support 51 on an interlocking track or slides with appropriate rollers, stops, spring loading and switch location. This would replace the complexities inherent in the telescoping control (inner tube 66 and beam 65) plus the bellcrank 84 and link 85 needed to accommodate that motion.

Another potential application for an interlocking track or slides in the embodiment illustrated in FIG. 2 is to replace with vertical slides the four parallel links 58, 59 and 60, which simulate elevating while controlling the attitude of elevating assembly 62. Similarly, the internal locking detailed in FIG. 2 and described above, may be adapted to be used in the embodiments illustrated in FIGS. 1 and 3.

Figures 4, 4A, 4B:
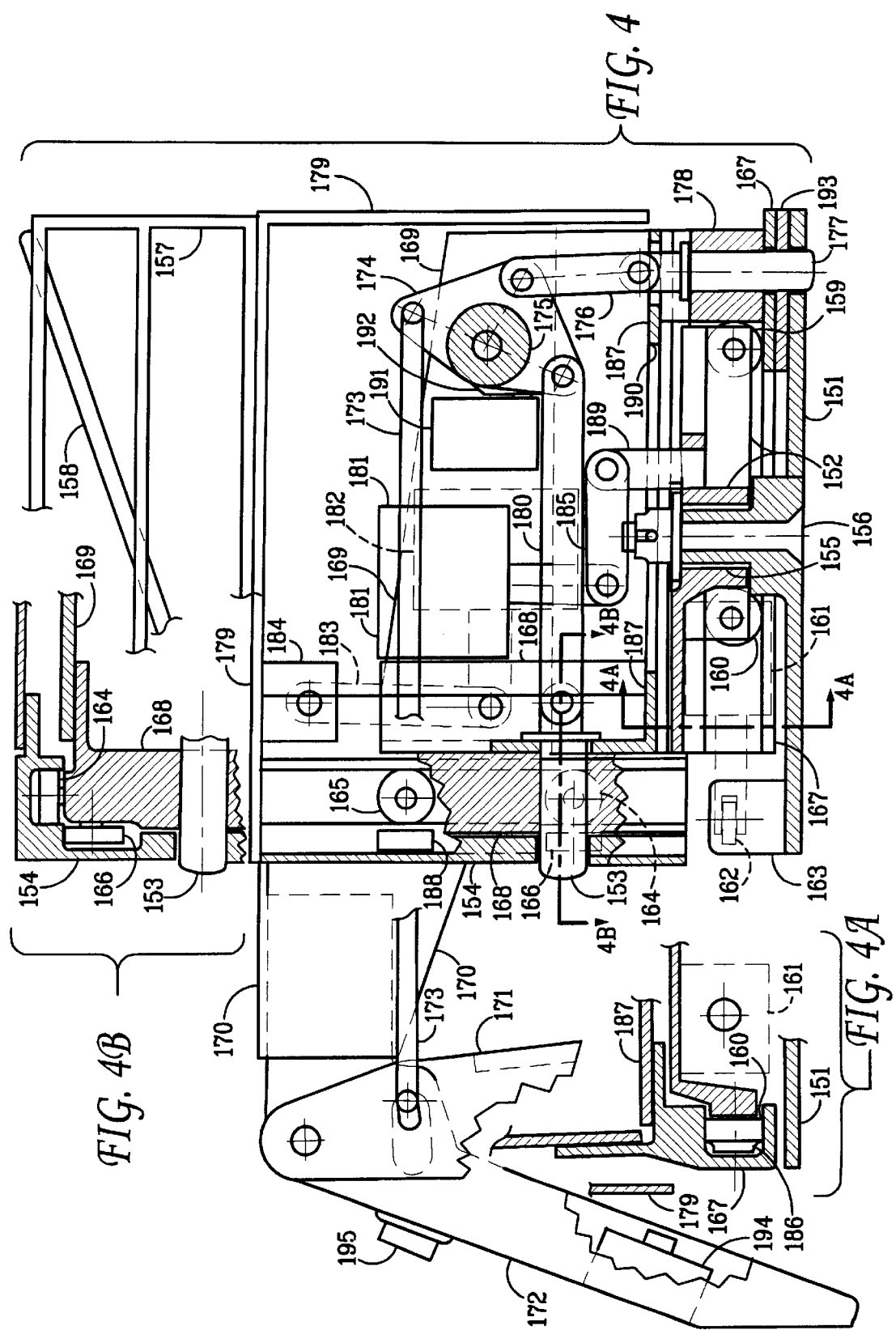
FIG. 4 is a side elevation view, partially broken away, showing another embodiment of the analog control of the present invention.
FIG. 4A shows a view taken through a portion of FIG. 4.
FIG. 4B shows a view taken through a portion of FIG. 4.

Another embodiment of the analog control of the present invention is shown in FIG. 4 and defines an approach using tracks and sliding motion for both vertical and horizontal motion which is well suited to the Type 3 aerial platform, as discussed above with reference to FIG. 2, although the elements may be used on controls for other type aerial platforms. In FIG. 4 fixed structure 151 is attached to structure at the operator's station on the platform. Rotating structure 152 is attached to fixed structure 151 by bolt 156 and can be rotated on bearing 155. Steer switch 161 is shown in phantom attached to the lower side of rotating structure 152. When rotating structure 151 is rotated, steer switch 161 is operated by contact of wheel 162 on clip 163 which is attached to fixed structure 151. An equivalent clip contacts the other side of wheel 162 when rotating structure 151 is rotated in the opposite direction.

Rollers for horizontal motion are indicated by rollers 159 and 160, two at each end of rotating structure 152. Horizontal track 167 is engaged to roll on and be constrained by rollers 159 and 160 to simulate motions analogous to driving the aerial platform forward or rearward. The rollers 159 and 160 have a shoulder 186 to resist lateral forces in the horizontal plane between rotating structure 152 and track 167. Attached to the vertical flanges of horizontal tracks 167 are brackets 169 (one on the vertical flange of each horizontal track 167). On one bracket 169 the drive control switch 181 is attached. Shown in phantom is lift control switch 182 which is attached to the side of the other bracket 169 such that the space between the switches is open for clearance from the locking and unlocking mechanism. Attached to bracket 169 on the same side as drive control switch 181 is power supply switch 191 as described in embodiment No. 2.

Also attached to the horizontal flanges of horizontal tracks 167 is horizontal pan 187 which has a suitable opening 190 for clearance from parts attached to rotating structure 152. Post 189 is anchored in rotating structure 152 and operates drive control switch 181 via link 185 as the control assembly attached to horizontal tracks 167 is moved to the left or to the right in FIG. 4. Lift control switch 182 is operated by link 183 which is pivotally attached to clip 184 which in turn is attached to cover 179. Cover 179 moves up or down as handgrip 172 is operated to raise or lower the platform of the aerial platform. Cover 179 is attached to vertical tracks 154 and encloses the mechanism on the top, both sides and the end opposite vertical tracks 154.

Vertical roller support 168 is attached to pan 187 and to both brackets 169 to form a rigid structure along with horizontal tracks 167. Vertical roller support 168 provides support for two sets of rollers, 164 and 165 in one plane and two sets of rollers, 166 and 188 in the plane at ninety degrees, to restrain vertical roller support 168 against forces in any potential direction except vertical. Vertical track 154 is engaged with the four pairs of rollers, 164, 165, 166 and 188, and is thereby constrained against any forces except vertical with respect to vertical roller support 168; see FIG. 4B.

The control in FIG. 4 is operated by handgrip 172 which is attached to vertical tracks 154 and cover 179 by bracket 170. Safety switch 194 is located in handgrip 172 as in the other embodiments except that it is shown in FIG. 4 with the operating pin recessed within handgrip 172 so as to minimize the likelihood of safety switch 194 being operated inadvertently or defeated deliberately. In this embodiment safety switch 194 is operated by a properly located pin within safety lever 171 such that the final travel of safety lever 171 as it is pulled by the operator causes the pin to contact the operating pin of safety switch 194.

When safety lever 171 is pulled, it causes link 173 to operate bellcrank 174 in a counterclockwise direction. Bellcrank 174 includes a trunnion 175 which is pivoted between the two brackets 169. Link 173 passes through slots in vertical tracks 154 and in vertical roller support 168. As the bellcrank 174 is rotated, it pulls link 176 and withdraws drive lockpin 177 from its engagement with fixed structure 151. Lockpin 177 also passes through spacer 193 which is attached to cross member 178 and thereby to horizontal tracks 167. Cross member 178 is also attached to pan 187 and thereby to vertical roller support 168. When drive lockpin 177 is withdrawn from fixed structure 151, it also permits rotation of the rotating structure 152 and the horizontal tracks 167 with items attached thereto so that rotation will cause steer switch 161 to be operated.

Counterclockwise rotation of bellcrank 174 also pulls link 180 and withdraws lift lockpin 153 from its hole in vertical tracks 154, thereby permitting vertical tracks 154 and attached cover 179 to be raised or lowered to operate lift switch 182. Thus, operating safety lever 171 by squeezing it toward handgrip 172 causes the control to be unlocked for all three control motions and also operates safety switch 194 so that the controls become operational. Power supply switch 191 which is operated by a flange 192 of bellcrank 174 is a backup safety feature which will permit starting of the engine powerplant or activation of the primary power relay only if the control is locked in the position shown in FIG. 4.

Attached to and supported by cover 179 is simulated platform 157 which is shaped to have a configuration analogous to that of the aerial platform on which the control is mounted. A placard 158 may be mounted on simulated platform 157 to provide important instructions. The rollers in this embodiment may be replaced with sliding blocks of a suitable low-friction material. It is to be understood that the controls are spring loaded to return to the neutral and locked position shown in FIG. 4 when the control is released and that mechanical detents are provided to prevent inadvertent operation of an unintended function while operating an intended control motion. Mechanical stops are also provided to limit control motion without damage to switches or other mechanisms.

The present invention therefore provides an analog control for aerial work platforms. The control of the present invention is comprised of a control mechanism that looks substantially like and has substantially the same motions as a machine such as an aerial work platform that is being controlled. The control of the present invention has an appearance analogous to the overall aerial platform or other equipment under control. When the operator moves the control in a certain direction, the resulting motion of the machine is analogous to that of the control. This arrangement leads to the following advantages as compared to prior art controls. First, the present invention is easy for an unskilled operator to understand since the motion of the machine is the same as the motion of the control. Second, the present invention is safer than conventional controls since the probability of inadvertently making an incorrect control motion will be decreased even for a skilled operator. The present invention also combines at least three of the primary controls into a single control for operator use. The present invention thus provides greater work efficiency because of its simplicity and its analog characteristics. Finally, the present invention includes the safety control required by some of the ANSI/SIA A92 Standards, the industry consensus standards for aerial work platforms.

Thus, the present invention is applicable to any mobile machine which carries the operator and provides control which has a shape, geometry and motion analogous to that of the machine and which causes machine motion analogous to the motion imparted to the control by the operator. The analog control may be applied on mobile equipment including aerial work platforms, forklifts, front end loaders, backhoes, earth movers, bulldozers, diggers, trenchers, agricultural equipment, mining machinery, and other operator controlled vehicular equipment by tailoring the shape, geometry and motions of the control to be analogous to those of the machine being controlled.

Four specific embodiments are defined for three general types of aerial platforms. While the embodiments are shown without dust seals or other means to prevent contamination, it is recognized that the environment in construction or other areas of use may present serious problems of dust, paint or other contaminants that must be guarded against. Therefore, it is to be understood that all of the embodiments may be equipped with suitable seals that will prevent contamination in the expected environment.

Although the invention has been described in terms of an exemplary embodiment, the spirit and scope of the appended claims are not to be limited by any details not expressly stated in the claims. Upon review of the foregoing, numerous alternative embodiments will present themselves to those of skill in the art. Accordingly, reference should be made to the appended claims in order to determine the full scope of the present invention.

What is claimed is:

1. A device comprising:
   an aerial work platform; and
   an analog control, mounted on the aerial work platform, for effecting motion of said aerial work platform, said analog control having:
      a shape similar to the aerial work platform; mechanisms having motions corresponding to motions of the aerial work platform to cause an equivalent motion of the aerial work platform when operated; a rotating structural element; and a simulated boom having an inner boom section and an outer boom section, said inner boom section capable of telescoping within said outer section; and
   a mechanism for causing lifting or lowering of the aerial work platform operatively coupled to said rotating structural element, and wherein the mechanism for causing lifting is actuated by raising or lowering said simulated boom.

2. The device of claim 1, further comprising a switch mounted on the outer boom near a hinged end thereof, whereby telescoping motion of the inner boom section provides an equivalent motion of the aerial platform.

3. The device of claim 1, further comprising a lift switch and a bracket attached to the outer boom, said bracket controlling the lift switch, said lift switch supported on the rotating structure through a connecting link, thereby causing lifting or lowering of the aerial platform.

4. The device of claim 1, further comprising a handgrip and a safety lever, said inner boom section attached to a handgrip at an outer end thereof, said safety lever disposed proximate the handgrip so that it is convenient for the operator to squeeze the handgrip and the safety lever with one hand.

5. The analog control of claim 4, further comprising an on/off safety switch operated by the safety lever.

6. The analog control of claim 4, wherein the safety lever supports a detent for limiting the motion of the inner boom seen relative to the outer boom section, whereby telescoping motion is prevented unless the safety lever is operated.

7. The device of claim 4 further comprising a switch operatively coupled to said safety lever, said switch preventing inadvertent operation of said analog control unless said switch is actuated by the safety lever.

8. The device of claim 4 wherein said analog control includes an enable switch operatively coupled thereto to enable said analog control to produce driving and steering signals, said enable switch having a first position enabling said analog control to control said mechanism for causing lifting or lowering of the aerial work platform, said enable switch having a second position enabling said analog control to produce said driving and steering signals.

9. The device of claim 8 wherein said enable switch in said first position disables said driving and steering signals and said enable switch in said second position disables said mechanism for causing lifting and lowering of the aerial work platform.

10. The device of claim 9 wherein said handgrip is coupled to the simulated boom, such that while said enable switch is in said second position, said analog control produces a forward motion signal in response to forward urging of said handgrip, and said analog control produces a left steering signal in response to a leftward urging of said handgrip and a right steering signal in response to a rightward urging of said handgrip.

11. The device of claim 8 wherein said enable switch is disposed on said handgrip such that said enable switch may be thumb-actuated.

12. The device of claim 4 wherein said analog control includes an auxiliary function switch disposed on said handgrip for controlling auxiliary functions of said aerial work platform.

13. The device of claim 1, wherein a part of the outer boom section comprises brackets that support a pivot for a lock lever that acts as a detent to limit swing and lift motions of the simulated boom.

14. The device of claim 13, wherein the lock lever is operated by a lock link when the operator pulls the safety lever toward the handgrip.

15. The device of claim 1 wherein said aerial work platform comprises a rotating turntable coupled to said rotating structural element, said rotating structural element being capable of rotation by the operator that causes corresponding rotating motion of said rotating turntable of the aerial work platform.

16. A device comprising:
   an aerial work platform; and
   an analog control, mounted on a platform of the aerial work platform, for effecting motion of said aerial work platform, said analog control having:
      a structure structurally mounted to the platform of the aerial work platform at an operator station;
      movable members, coupled to the structure, that simulate and correspond to mechanisms of the aerial work platform, the movable members capable of movements by the operator that impart corresponding motions to the mechanisms of the aerial work platform, the movable members comprising a telescoping boom member that simulates and corresponds to a telescoping boom of the aerial work platform, the telescoping boom member capable of limited telescoping movements by the operator that impart corresponding telescoping motions to the telescoping boom of the aerial work platform; and at least three motion controls, operatively coupled to the movable members, incorporated within the analog control in a single unit;

such that the aerial work platform undergoes motions that correspond to movements imparted to the analog control by the operator.

17. The device of claim 16 wherein a direction of the motion of said aerial work platform is substantially the same as a direction of the movement of said analog control imparted by the operator, and the speed of the motion of the aerial work platform is proportional to a displacement applied to the analog control by the operator.

18. A device comprising:

an aerial work platform; and an analog control, mounted on a platform of the aerial work platform, for effecting motion of said aerial work platform, said analog control having:

a structure structurally mounted to the platform of the aerial work platform at an operator station;

movable members, coupled to the structure, that simulate and correspond to mechanisms of the aerial work platform, the movable members capable of movements by the operator that impart corresponding motions to the mechanisms of the aerial work platform, the movable members comprising an articulating boom member that simulates and corresponds to an articulating boom of the aerial work platform, the articulating boom member capable of limited articulating movements by the operator that impart corresponding articulating motions of the articulating boom of the aerial work platform; and at least three motion controls, operatively coupled to the movable members incorporated within the analog control in a single unit;

such that the aerial work platform undergoes motions that correspond to movements imparted to the analog control by the operator.

19. The device of claim 18 further comprising a handgrip for convenient grasping by said operator of said aerial platform, said handgrip mechanically coupled to an end of said articulating boom member.

20. A device comprising:

an aerial work platform; and an analog control mounted, on a platform of the aerial work platform, for effecting motion of said aerial work platform, said analog control having:

a structure structurally mounted to the platform of the aerial work platform at an operator station;

movable members, coupled to the structure, that simulate and correspond to mechanisms of the aerial work platform, the movable members capable of movements by the operator that impart corresponding motions to the mechanisms of the aerial work platform, the movable members comprise a scissor lift member that simulates and corresponds to a scissor lift mechanism of the aerial work platform, the scissor lift member capable of limited up-and-down movement by the operator that imparts corresponding up-and-down motion of the scissor lift mechanism of the aerial work platform; and at least three motion controls, operatively coupled to the movable members, incorporated within the analog control in a single unit;

such that the aerial work platform undergoes motions that correspond to movements imparted to the analog control by the operator.

21. The device of claim 20 wherein said at least three motion controls include controls for driving and steering said aerial work platform.

22. A device comprising:

an aerial work platform having a supporting base, an operator platform, and an elevating mechanism that raises the operator platform vertically but does not position the operator platform horizontally completely outside the base, and an analog control, mounted on the operator platform, for effecting motion of said aerial work platform, said analog control having:

a shape similar in appearance to the aerial work platform; and mechanisms having motions corresponding to motions of the aerial work platform to cause an equivalent motion of the aerial work platform when operated, said mechanisms including a sliding structure, a rotating structure, first rollers coupled to the rotating structure with matching tracks on the analog control to simulate horizontal travel, and second rollers coupled to the sliding structure in a vertical orientation with matching tracks on the analog control to simulate raising and lowering of the platform.

* * * * *